(12) United States Patent
Akuta et al.

(10) Patent No.: US 11,499,018 B2
(45) Date of Patent: Nov. 15, 2022

(54) HYDROGEL, USE THEREOF, AND PRODUCTION METHOD THEREFOR

(71) Applicant: SEKISUI PLASTICS CO., LTD., Osaka (JP)

(72) Inventors: Ryo Akuta, Osaka (JP); Koichiro Okamoto, Osaka (JP)

(73) Assignee: SEKISUI PLASTICS CO., LTD., Osaka (JP)

( * ) Notice: Subject to any disclaimer, the term of this patent is extended or adjusted under 35 U.S.C. 154(b) by 464 days.

(21) Appl. No.: 16/629,087

(22) PCT Filed: May 18, 2018

(86) PCT No.: PCT/JP2018/019357
§ 371 (c)(1),
(2) Date: Jan. 7, 2020

(87) PCT Pub. No.: WO2019/039009
PCT Pub. Date: Feb. 28, 2019

(65) Prior Publication Data
US 2020/0190266 A1 Jun. 18, 2020

(30) Foreign Application Priority Data
Aug. 24, 2017 (JP) .............................. JP2017-161255

(51) Int. Cl.
*C08J 3/075* (2006.01)
*C08L 25/06* (2006.01)
*C08L 33/02* (2006.01)
*H01M 10/26* (2006.01)

(52) U.S. Cl.
CPC ............... *C08J 3/075* (2013.01); *C08L 25/06* (2013.01); *C08L 33/02* (2013.01); *H01M 10/26* (2013.01); *C08J 2325/06* (2013.01); *C08J 2333/02* (2013.01)

(58) Field of Classification Search
CPC .... C08J 3/075; C08J 2325/06; C08J 2333/02; C08L 33/02; C08L 25/06; H01M 10/26
USPC ........................................................ 429/206
See application file for complete search history.

(56) References Cited

U.S. PATENT DOCUMENTS

2018/0163004 A1* 6/2018 Nishiumi .............. C08L 101/00

FOREIGN PATENT DOCUMENTS

| JP | 2005-322635 | 11/2005 |
|---|---|---|
| JP | 2009-1625 | 1/2009 |
| JP | 2014-40550 | 3/2014 |
| WO | 2017/051734 | 3/2017 |

OTHER PUBLICATIONS

Office Action for Japanese Patent Application No. 2017-161255 dated Oct. 16, 2018, with English translation thereof.
Notice of Allowance for Japanese Patent Application No. 2017-161255 dated Nov. 13, 2018, with English translation thereof.
International Search Report issued in International Patent Application No. PCT/JP2018/019357, dated Jul. 17, 2018.
International Preliminary Report on Patentability issued in International Patent Application No. PCT/JP2018/019357, dated Feb. 25, 2020.
Notice of Allowance for Korean Patent Application No. 10-2019-7037518 dated Aug. 23, 2021, along with English translation thereof.
Extended European Search Report for European Patent Application No. 18848150.1 dated Apr. 26, 2021.
Wang, et al., *Journal of Macromolecular Science, Part B: Physics*, 45:4, 563-571, published on Aug. 16, 2006.
Office Action for Chinese Patent Application No. 201880041996.7 dated Dec. 27, 2021 and English translation thereof.
Notice of Allowance issued in Chinese Patent Application No. 201880041996.7 dated Jun. 15, 2022, along with English translation thereof.

* cited by examiner

*Primary Examiner* — Hui H Chin
(74) *Attorney, Agent, or Firm* — Greenblum & Bernstein, P.L.C.

(57) ABSTRACT

A hydrogel has water, a polyvinylsulfonic acid-based polymer, and a polymer matrix containing the water and the polyvinylsulfonic acid-based polymer, in which the polymer matrix contains a copolymer of a monofunctional monomer having one ethylenically unsaturated group and a polyfunctional monomer having 2 to 6 ethylenically unsaturated groups, the copolymer has a hydrophilic group binding to its main chain, the polymer matrix is contained in an amount of 2 to 80 parts by mass in 100 parts by mass of the hydrogel, a polymer derived from the polyfunctional monomer is contained in a proportion of 0.1 to 5 parts by mass in 100 parts by mass of the copolymer, the polyvinylsulfonic acid-based polymer is contained in an amount of 0.1 to 150 parts by mass in 100 parts by mass of the polymer matrix, and the polyvinylsulfonic acid-based polymer has a weight average molecular weight of 200,000 to 3,000,000.

11 Claims, No Drawings

HYDROGEL, USE THEREOF, AND PRODUCTION METHOD THEREFOR

CROSS REFERENCE TO RELATED APPLICATION

This Application is a National Phase of PCT/JP2018/019357 filed on May 18, 2018, which, in turn, claimed the priority of Japanese Patent Application No. 2017-161255 which was filed on Aug. 24, 2017.

TECHNICAL FIELD

The present invention relates to a hydrogel, use thereof, and a production method therefor. The hydrogel of the present invention can be suitably used in applications requiring strength and alkali resistance, such as an alkaline secondary battery, a backfill used in electric anticorrosion process, a member for realkalization, and a member for desalting.

BACKGROUND TECHNOLOGY

An alkaline secondary battery is widely used in the fields of mobile batteries of a cellular phone, a laptop computer or the like, batteries of an electric car or a hybrid car, and further, storage batteries for renewable energy such as solar power generation and wind-power generation.

A strong base such as sodium hydroxide or potassium hydroxide is used in an electrolyte of an alkaline secondary battery, and a configuration that liquid leakage is prevented is taken in order to secure safety. Furthermore, a separator for an alkaline secondary battery has been required to have a high water content in order to realize high electric conductivity, and to have water retentivity in order to prevent drying of an electrolytic solution during use.

Under such circumstances, in the field of an alkaline secondary battery, in order to prevent liquid leakage and drying while retaining electric conductivity, and to impart a water content, gelling of an electrolyte and application thereof have been investigated. For example, as a polymer hydrogel electrolyte, Japanese Unexamined Patent Application, First Publication No. 2005-322635 (Patent Document 1) discloses a polymer hydrogel electrolyte for an alkaline battery, containing alkali hydroxide in a polymer composition composed of polyvinyl alcohol and an anionic crosslinking copolymer. Further, International Publication WO 2017-51734 (Patent Document 2) discloses a hydrogel that has excellent mechanical strength even in a state where a water content is high and that can be used as a self-supported film, by forming a Semi-Interpenetrating Polymer Network (S-IPN) structure where a polyvinyl alcohol-based polymer penetrates a copolymer having a crosslinking network structure by adding a polyvinyl alcohol-based polymer as a strength reinforcing material to a hydrogel precursor and polymerizing the resultant.

DOCUMENTS OF RELATED ART

Patent Documents

Patent Document 1: Japanese Unexamined Patent Application, First Publication No. 2005-322635
Patent Document 2: International Publication WO 2017-51734

SUMMARY OF THE INVENTION

Problem to be Solved by the Invention

Since an alkaline secondary battery may produce heat when used outdoors for a long time or at the time of charging, a material for a battery is required to have alkali resistance under high temperature environment.

However, since the hydrogel described in Patent Document 1 has a low degree of crosslinking and a small interaction between gels, there is a problem that the strength is low under high temperature alkaline conditions.

Furthermore, since a polyvinyl alcohol-based polymer that is a strength reinforcing material takes a contracted state due to the salting-out effect under ambient temperature alkaline conditions, the hydrogel described in Patent Document 2 exhibits high mechanical strength; however, there is a problem that strength degradation may be possibly caused by decomposition of a main chain under high temperature alkaline conditions.

Accordingly, in the hydrogels of both patent documents, there is room for improvement.

Means for Solving the Problem

Thus, the present invention provides a hydrogel comprising water, a polyvinylsulfonic acid-based polymer, and a polymer matrix containing the water and the polyvinylsulfonic acid-based polymer,
wherein
the polymer matrix contains a copolymer of a monofunctional monomer having one ethylenically unsaturated group and a polyfunctional monomer having 2 to 6 ethylenically unsaturated groups,
the copolymer has a hydrophilic group binding to its main chain,
the polymer matrix is contained in an amount of 2 to 80 parts by mass in 100 parts by mass of the hydrogel,
a polymer derived from the polyfunctional monomer is contained in a proportion of 0.1 to 5 parts by mass in 100 parts by mass of the copolymer,
the polyvinylsulfonic acid-based polymer is contained in an amount of 0.1 to 150 parts by mass in 100 parts by mass of the polymer matrix, and
the polyvinylsulfonic acid-based polymer has a weight average molecular weight of 200,000 to 3,000,000.

Also, the present invention provides a gel-like electrolyte comprising the hydrogel and an alkali component contained in the hydrogel.

Further, the present invention provides a secondary battery including the hydrogel or the gel-like electrolyte.

Also, the present invention provided a method for producing the hydrogel, comprising steps of:
preparing a hydrogel precursor containing water, a polyvinylsulfonic acid-based polymer, a monofunctional monomer having one ethylenically unsaturated group, a polyfunctional monomer having 2 to 6 ethylenically unsaturated groups, and a polymerization initiator; and
polymerizing the monofunctional monomer and the polyfunctional monomer to obtain the hydrogel.

Effects of Invention

The present invention can provide a hydrogel having high mechanical strength even under alkaline conditions by including a polyvinylsulfonic acid-based polymer as one of components constituting the hydrogel. The hydrogel of the present invention has characteristics such that it has mechanical strength higher than that of a hydrogel not containing a polyvinylsulfonic acid-based polymer, and even when the hydrogel is immersed in an alkaline solution for a long time under high temperature environment, a degree of swelling is not increased and reduction in strength is small, Furthermore, the present invention can provide a hydrogel having higher mechanical strength when any of the following configurations is satisfied.

(1) When a degree of swelling during immersion in a 7M aqueous potassium hydroxide solution for 1 week under a temperature of 25° C. is represented by $B_{25°\ C.\ [1\ week]}$ and a degree of swelling during immersion in a 7M aqueous potassium hydroxide solution for 1 week under a temperature of 60° C. is represented by $B_{60°\ C.\ [1\ week]}$, the hydrogel has a degree of swelling of $B_{60°\ C.\ [1\ week]}$ and $B_{25°\ C.\ [1\ week]}$ being 550% or less.

(2) The hydrogel has a ratio of degree of swelling $B_{60°\ C.\ [1\ week]}/B_{25°\ C.\ [1\ week]}$ of 0.5 to 1.5.

(3) When a piercing strength during immersion in a 7M aqueous potassium hydroxide solution for 1 week under a temperature of 25° C. is represented by $F_{25°\ C.\ [1\ week]}$ and a piercing strength during immersion in a 7M aqueous potassium hydroxide solution for 1 week under a temperature of 60° C. is represented by $F_{60°\ C.\ [1\ week]}$, the hydrogel has a piercing strength of $F_{60°\ C.\ [1\ week]}$ and $F_{25°\ C.\ [1\ week]}$ being 0.25 N or more.

(4) The hydrogel has a piercing strength ratio $(F_{25°\ C.\ [1\ week]} - F_{60°\ C.\ [1\ week]})/F_{25°\ C.\ [1\ week]}$ of 0.5 or less.

(5) The monofunctional monomer is selected from (meth)acrylic acid, (meth)acrylamide, sodium (meth)acrylate, potassium (meth)acrylate, zinc (meth)acrylate, dimethyl (meth)acrylamide, vinylsulfonic acid, sodium vinylsulfonate, p-styrenesulfonic acid, sodium p-styrenesulfonate, allylsulfonic acid, sodium allylsulfonate, 2-(meth)acrylamido-2-methylpropanesulfonic acid, 3-((meth)acryloyloxy)-1-propanesulfonic acid, potassium 3-((meth)acryloyloxy)-1-propanesulfonate, 3-((meth)acryloyloxy)-2-methyl-1-propanesulfonic acid, potassium 3-((meth)acryloyloxy)-2-methyl-1-propanesulfonate, N-vinylacetamide, N-vinylformamide, allylamine, 2-vinylpyridine, and 4-vinylpyridine, the polyfunctional monomer is selected from divinylbenzene, sodium divinylbenzenesulfonate, divinylbiphenyl, divinylsulfone, diethylene glycol divinyl ether, pentaerythritol triallyl ether, pentaerythritol tetraallyl ether, dimethyldiallylammonium chloride, N,N'-methylenebis(meth)acrylamide, ethylene glycol di(meth)acrylate, glycerin tri(meth)acrylate, polyethylene glycol di(meth)acrylate, polypropylene glycol di(meth)acrylate, and polyglycerin di(meth)acrylate, and the polyvinylsulfonic acid-based polymer is selected from polystyrenesulfonic acid, sodium polystyrenesulfonate, potassium polystyrenesulfonate, calcium polystyrenesulfonate, polyvinylsulfonic acid, sodium polyvinylsulfonate, and potassium polyvinylsulfonate.

BEST MODE FOR CARRYING OUT THE INVENTION (Hydrogel)

A hydrogel contains a polymer matrix, a polyvinylsulfonic acid-based polymer, and water.

As a mechanism that the mechanical strength of the hydrogel is improved by containing the polyvinylsulfonic acid-based polymer, the present inventors consider as follows. The polyvinylsulfonic acid-based polymer is contained in a component constituting a hydrogel having a crosslinking network structure, the polyvinylsulfonic acid-based polymer penetrates the crosslinking network structure to form a mutually entangled structure. It is considered that this strengthens a network structure and the mechanical strength of the hydrogel is improved. Further, a functional group binding to the polyvinylsulfonic acid-based polymer and a functional group binding to the crosslinking network structure of the hydrogel interact by a noncovalent bond such as a hydrogen bond, so that the network structure can be made to be more firm than a hydrogel not containing the polyvinylsulfonic acid-based polymer.

Further, under alkaline environment, the polyvinylsulfonic acid-based polymer takes an aggregated state due to the salting-out effect, so that the expanse of the network structure of the hydrogel during immersion of the hydrogel in an alkaline solution is suppressed and swellability can be reduced. As a result, the strengthening of the network structure and suppression of swelling due to the aggregation caused by salting-out can maintain high mechanical strength even under alkaline environment.

(1) Polymer Matrix

A polymer matrix contains a copolymer of a monofunctional monomer having one ethylenically unsaturated group and a polyfunctional monomer having 2 to 6 ethylenically unsaturated groups. This copolymer can be formed by polymerizing and crosslinking both the monomers.

The polymer matrix is contained in an amount of 2 to 80 parts by mass in 100 parts by mass of the hydrogel. When the content is less than 2 parts by mass, the strength of the hydrogel may be reduced so that the hydrogel may not retain a sheet shape. When the content is more than 80 parts by mass, ion movement is inhibited, so that an electric resistance may be high. The preferable content is 5 to 70 parts by mass, and the more preferable content is 10 to 60 parts by mass. The content may be 2 parts by mass, 5 parts by mass, 10 parts by mass, 20 parts by mass, 30 parts by mass, 40 parts by mass, 50 parts by mass, 60 parts by mass, 70 parts by mass or 80 parts by mass.

The copolymer has a hydrophilic group binding to its main chain. Examples of the hydrophilic group include a carboxyl group, a hydroxyl group, an amino group, a sulfone group, and the like. It is preferable that the number of the hydrophilic group is a number such that an equivalent of hydrophilic functional group (molecular weight per functional group) of the monofunctional monomer constituting the polymer matrix is 300 g/mol or less.

It is preferable that the copolymer is contained in an amount of 80 to 100 parts by mass in 100 parts by mass of the polymer matrix. When the content is less than 80 parts by mass, the strength of the hydrogel may be reduced. The content may be 80 parts by mass, 85 parts by mass, 90 parts by mass, 95 parts by mass or 100 parts by mass. It is more preferable that the polymer matrix consists of only the copolymer.

(a) Monofunctional Monomer

The monofunctional monomer is not particularly limited as long as it has one ethylenically unsaturated group. Furthermore, the monofunctional monomer is preferably a monomer having hydrophilicity to water. Herein, the hydrophilicity means that 1 g or more is dissolved in 100 g of water. Examples of the monofunctional monomer include (meth)acrylic acid, (meth)acrylamide, sodium (meth)acrylate, potassium (meth)acrylate, zinc (meth)acrylate, dimethyl(meth)acrylamide, vinylsulfonic acid, sodium vinylsulfonate, p-styrenesulfonic acid, sodium p-styrenesulfonate, allylsulfonic acid, sodium allylsulfonate, 2-(meth)acrylamido-2-methylpropanesulfonic acid, 3-((meth)acryloyloxy)-1-propanesulfonic acid, potassium 3-((meth)acryloyloxy)-1-propanesulfonate, 3-((meth)acryloyloxy)-2-methyl-1-propanesulfonic acid, potassium 3-((meth)acryloyloxy)-2-methyl-1-propanesulfonate, N-vinylacetamide, N-vinylformamide, allylamine, 2-vinylpyricline, 4-vinylpyridine, and the like. The monofunctional monomer may be only one kind or may be a mixture of a plurality of kinds. When the hydrogel is used in an alkaline battery, a monomer having no functional group that is hydrolyzed with an alkali is more preferable, and examples of such a monofunctional monomer include acrylic acid, vinylsulfonic acid, sodium vinylsulfonate, sodium p-styrenesulfonate, and the like.

(b) Polyfunctional Monomer

The polyfunctional monomer is not particularly limited as long as it has 2 to 6 ethylenically unsaturated groups. Examples of the polyfunctional monomer include divinylbenzene, sodium divinylbenzenesulfonate, divinylbiphenyl, divinylsulfone, diethylene glycol divinyl ether, pentaerythritol triallyl ether, pentaerythritol tetraallyl ether, dimethyldiallylammonium chloride, N,N'-methylenebis(meth)acrylamide, ethylene glycol di(meth)acrylate, glycerin tri(meth)acrylate, polyethylene glycol di(meth)acrylate, polypropylene glycol di(meth)acrylate, polyglycerin di(meth)acrylate, and the like. The polyfunctional monomer may be only one kind or may be a mixture of a plurality of kinds.

(c) Proportion of Polyfunctional Monomer

A polymer derived from the polyfunctional monomer is contained in a proportion of 0.1 to 5 parts by mass based on 100 parts by mass of the copolymer. When the proportion of the polymer derived from the polyfunctional monomer is less than 0.1 parts by mass, the crosslinking density may be reduced. When the proportion is more than 5 parts by mass, the polymer derived from the polyfunctional monomer may be phase-separated, so that a hydrogel having an ununiform crosslinked structure may be produced. The proportion is preferably 0.2 to 4.5 parts by mass and more preferably 0.4 to 4.0 parts by mass. The proportion may be 0.1 parts by mass, 0.2 parts by mass, 0.4 parts by mass, 1 part by mass, 2 parts by mass, 3 parts by mass, 4 parts by mass, 4.5 parts by mass or 5 parts by mass.

In addition, the copolymer contains components derived from the monofunctional monomer and the polyfunctional monomer, and a use amount of each monomer at the time of production of the copolymer and the content of each component in the copolymer are almost the same. Furthermore, the content of the polymer derived from the polyfunctional monomer in the copolymer can be measured by pyrolysis GC/MS.

(d) Another Monomer

A component derived from another monomer other than the above-mentioned monofunctional monomer and the polyfunctional monomer may be contained in the copolymer in the mode of being copolymerized with the above-mentioned monofunctional monomer and/or the polyfunctional monomer in a range where the effect of the present invention is not inhibited. A proportion of the other monomer contained in 100 parts by mass of all monomers is preferably 5 parts by mass or less. It is more preferable that all monomers consist of the above-mentioned monofunctional monomer and the polyfunctional monomer.

(e) Another Polymer

Furthermore, another polymer other than the copolymer of the above-mentioned monofunctional monomer and the polyfunctional monomer may be contained in the polymer matrix in the mode of not being polymerized with the above-mentioned copolymer in a range where the effect of the present invention is not inhibited. Examples of the other polymer include a cellulose derivative and the like. A proportion of the other polymer contained in 100 parts by mass of the polymer matrix is preferably less than 20 parts by mass. The proportion may be 0 parts by mass, 1 part by mass, 5 parts by mass, 10 parts by mass, 15 parts by mass or 20 parts by mass.

(2) Polyvinylsulfonic Acid-Based Polymer

The polyvinylsulfonic acid-based polymer is not particularly limited as long as it can be used as an additive for the hydrogel.

Examples of the polyvinylsulfonic acid-based polymer include polymers derived from monomers having a vinyl group and a sulfonic acid group (including salts thereof), such as polystyrenesulfonic acid, sodium polystyrenesulfonate, potassium polystyrenesulfonate, calcium polystyrenesulfonate, polyvinylsulfonic acid, sodium polyvinylsulfonate, and potassium polyvinylsulfonate. It is preferable that the polyvinylsulfonic acid-based polymer has a weight average molecular weight of 200,000 to 3,000,000. When the weight average molecular weight is less than 200,000, the effect of improving the mechanical strength may not be obtained. Further, in that case, when immersed in an alkali, the hydrogel may contract ununiformly to have a distorted shape. When the weight average molecular weight exceeds 3,000,000, an increase in viscosity is remarkable so that uniform dissolution may not be obtained when the polyvinylsulfonic acid-based polymer is dissolved in a monomer-blended liquid at the time of preparing the hydrogel. The weight average molecular weight is preferably 250,000 to 2,500,000 and further preferably 300,000 to 2,000,000. The weight average molecular weight may be 200,000, 250,000, 300,000, 500,000, 700,000, 1,000,000, 1,500,000, 2,000,000, 2,500,000 or 3,000,000.

An amount of the sulfone group contained in the polyvinylsulfonic acid-based polymer is not particularly limited as long as the mechanical strength of the hydrogel can be improved. For example, all monomers for forming this polymer may have a sulfone group. Furthermore, the amount of the sulfone group may be adjusted by forming a copolymer of a monomer having a sulfone group and a monomer not having a sulfone group, like a copolymer of styrenesulfonic acid and styrene. The amount of the sulfone group can be measured, for example, by FT-IR. In addition, the present inventors consider that as the amount of the sulfone group is larger, the interaction between a polymer network and the polyvinylsulfonic acid-based polymer can be improved, and as a result, the mechanical strength can be improved even under alkaline environment.

It is preferable that the polyvinylsulfonic acid-based polymer is contained in an amount of 0.1 to 150 parts by mass based on 100 parts by mass of the above-mentioned polymer matrix. When the content is less than 0.1 parts by mass, the effect of improving the mechanical strength may not be obtained. When the content is more than 150 parts by mass, the viscosity is remarkably increased upon dissolution of this polymer in a monomer-blended liquid during preparation of the hydrogel, and as a result, a solution may not be obtained in which the polymer has been uniformly dissolved. The content is preferably 25 to 100 parts by mass. The content may be 0.1 parts by mass, 10 parts by mass, 25 parts by mass, 50 parts by mass, 70 parts by mass, 100 parts by mass, 120 parts by mass or 150 parts by mass.

(3) Water

It is preferable that water is contained in an amount of 20 to 98 parts by mass in 100 parts by mass of the hydrogel. When the content is less than 20 parts by mass, an amount of an alkali component that can be contained in the water is small, and when the hydrogel is used as an electrolyte of a battery, the impedance is high and desired battery properties may not be obtained. When the content is more than 98 parts by mass, the strength of the hydrogel may be reduced. The content is more preferably 30 to 95 parts by mass and further preferably 40 to 90 parts by mass. The content may be 20 parts by mass, 30 parts by mass, 40 parts by mass, 50 parts by mass, 60 parts by mass, 70 parts by mass, 90 parts by mass, 95 parts by mass or 98 parts by mass.

The alkali component may be dissolved in water. The dissolution of the alkali component makes it possible to use the hydrogel as a gel electrolyte for a secondary battery or in a realkalization method of a concrete. Examples of the alkali component include sodium hydroxide, potassium hydroxide, calcium hydroxide, barium hydroxide, lithium hydroxide, rubidium hydroxide, cesium hydroxide, tetramethylammonium hydroxide, tetraethylammonium hydroxide, and the like. It is preferable that an amount of the alkali component to be dissolved is an amount up to 70 parts by mass based on 100 parts by mass of water. When the amount of the alkali component to be dissolved is more than 70 parts by mass, an electrolyte concentration is too high, so that the impedance may be high. In the application for a gel electrolyte, the amount of the alkali component to be dissolved is sufficient to be 4 to 70 parts by mass, and in the application for a realkalization method, the amount of the alkali component to be dissolved is sufficient to be 20 to 70 parts by mass. The amount of the alkali component to be dissolved may be 4 parts by mass, 10 parts by mass, 20 parts by mass, 30 parts by mass, 40 parts by mass, 50 parts by mass, 60 parts by mass or 70 parts by mass in the application for a gel electrolyte, and may be 20 parts by mass, 30 parts by mass, 40 parts by mass, 50 parts by mass, 60 parts by mass or 70 parts by mass in the application for a realkalization method.

Furthermore, depending on application, an acid component may be dissolved in water.

(4) Other Components (a) Supporting Material

The hydrogel may contain a supporting material such as a woven fabric, a non-woven fabric or a porous sheet. When the hydrogel contains the supporting material, a shape of the hydrogel can be easily maintained. Examples of a material of the supporting material include natural fibers such as cellulose, silk, and hemp, synthetic fibers such as polyester, nylon, rayon, polyethylene, polypropylene, and polyurethane, and mixed fibers thereof. When the alkali component is contained, synthetic fibers such as rayon, polyethylene, and polypropylene, which have no component that is decomposed by the alkali component, and mixed fibers thereof are preferable. The supporting material may be positioned at any of a front surface, rear surface, and middle position of the hydrogel.

(b) Protective Film

The hydrogel may be provided with a protective film on a front surface and/or rear surface thereof. When the protective film is used as a separator, it is preferable that the protective film has been release-treated. When the hydrogel is provided with the protective film on both of a front surface and a rear surface, the peeling strength may be adjusted differently between the front surface and the rear surface. Furthermore, when the protective film is used as the supporting material, the protective film does not need to be subjected to the release treatment.

Examples of the protective film include films composed of polyester, polyolefin, polystyrene, polyurethane, paper, paper including a resin film (for example, polyethylene film, polypropylene film) laminated or the like. Examples of the release treatment include baking-type silicone coating in which crosslinking or curing reaction is caused by heat or ultraviolet rays.

(c) Additive

The hydrogel may contain an additive as necessary. Examples of the additive include an electrolyte, an antiseptic, a bactericide, an anti-mold agent, an antirust agent, an antioxidant, an anti-foaming agent, a stabilizer, a perfume, a surfactant, a coloring agent, a medicinal ingredient (for example, anti-inflammatory, vitamin agent, whitening agent, and the like), a gel strength improving agent (for example, polyvinyl alcohol-based polymer, cellulose nanofiber), a polyhydric alcohol, and the like.

For example, when the hydrogel contains an electrolyte, an electrically conductive hydrogel is obtained. The electrically conductive hydrogel can be used, for example, as a bioelectrode such as an electrode for measuring electrocardiogram, an electrode for low frequency therapeutic device, and various earth electrodes.

Furthermore, by adding a pressure-sensitive adhesive agent such as an acrylic-based emulsion or a phosphoric acid ester-type surfactant, the hydrogel can have pressure-sensitive adhesiveness. The hydrogel having pressure-sensitive adhesiveness can be used, for example, as a backfill used in electric anticorrosion process, a member for realkalization, and a member for desalting.

(5) Physical Properties of Hydrogel (a) Swelling Properties

A degree of swelling (%) as a proportion of the mass after immersion of the hydrogel in a 7M aqueous potassium hydroxide solution (after swelling with aqueous potassium hydroxide solution) to the mass before immersion (before swelling) is calculated. The degree of swelling is calculated regarding each of six cases where an immersion temperature is set to 25° C. and 60° C., and an immersion time is set to 1 week, 2 weeks, and 3 weeks. In the calculated values, each of degrees of swelling after 1 week immersion, 2 weeks immersion, and 3 weeks immersion at 25° C. is represented by $B_{25°\ C.\ [1\ week]}$, $B_{25°\ C.\ [2\ weeks]}$, or $B_{25°\ C.\ [3\ weeks]}$, and each of degrees of swelling after 1 week immersion, 2 weeks immersion, and 3 weeks immersion at 60° C. is represented by $B_{60°\ C.\ [1\ week]}$, $B_{60°\ C.\ [2\ weeks]}$, or $B_{60°\ C.\ [3\ weeks]}$.

In addition, a specific method of measuring the degree of swelling is described in Examples.

It is preferable that $B_{25°\ C.\ [1\ week]}$, $B_{25°\ C.\ [2\ weeks]}$ and $B_{25°\ C.\ [3\ weeks]}$ are 550% or less. Meanwhile, it is preferable that $B_{60°\ C.\ [1\ week]}$, $B_{60°\ C.\ [2\ weeks]}$ and $B_{60°\ C.\ [3\ weeks]}$ are 550% or less. When these six kinds of values are more than 550%, reduction in strength due to swelling may be caused. More preferable six kinds of values are 100 to 550%. Each of these six kinds of values may be 100%, 200%, 300%, 400%, 500% or 550%.

It is preferable that $B_{60°\ C.\ [1\ week]}/B_{25°\ C.\ [1\ week]}$ is 1.5 or less. When $B_{60°\ C.\ [1\ week]}/B_{25°\ C.\ [1\ week]}$ is more than 1.5, it means that the hydrogel has been swollen 1.5 times or more under 60° C. alkali environment than the case where the hydrogel is immersed under 25° C. alkali environment. When $B_{60°\ C.\ [1\ week]}/B_{25°\ C.\ [1\ week]}$ is more than 1.5, swelling under 60° C. cannot be suppressed and the mechanical strength of the hydrogel may be reduced. $B_{60°\ C.\ [1\ week]}/B_{25°\ C.\ [1\ week]}$ is preferably 1.45 or less and further preferably 1.40 or less. $B_{60°\ C.\ [1\ week]}/B_{25°\ C.\ [1\ week]}$ may be 0.5, 1, 1.1, 1.2, 1.3, 1.4, 1.45 or 1.5. When $B_{60°\ C.\ [1\ week]}/B_{25°\ C.\ [1\ week]}$ is 1.0, it indicates that swelling properties are not affected by the temperature, and means that the state of the polymer matrix constituting the hydrogel is not changed and the matrix is not decomposed. When $B_{60°\ C.\ [1\ week]}/B_{25°\ C.\ [1\ week]}$ is 1.0 or less, swelling under 60° C. can be suppressed and reduction in the mechanical strength of the hydrogel can be decreased. When $B_{60°\ C.\ [1\ week]}/B_{25°\ C.\ [1\ week]}$ is less than 0.5, it indicates that the hydrogel is easily affected by the temperature and the hydrogel may not be suitably used as an electrolyte for a battery. Such suppression of change in the state is the property particularly desired in the field of alkaline secondary battery.

$B_{60°\ C.\ [2\ weeks]}/B_{25°\ C.\ [2\ weeks]}$ and $B_{60°\ C.\ [3\ weeks]}/B_{25°\ C.\ [3\ weeks]}$ also show the same tendency as that of $B_{60°\ C.\ [1\ week]}/B_{25°\ C.\ [1\ week]}$.

(b) Piercing Strength

An average value of a maximum stress until a tip of a jig having a diameter of 3 mm penetrates a hydrogel immersed in a 7M aqueous potassium hydroxide solution is defined as piercing strength. An immersion temperature and an immersion time are the same as those for the above-mentioned degree of swelling. Each of piercing strengths after 1 week immersion, 2 weeks immersion, and 3 weeks immersion at 25° C. is represented by $F_{25°\ C.\ [1\ week]}$, $F_{25°\ C.\ [2\ weeks]}$, or $F_{25°\ C.\ [3\ weeks]}$, and each of piercing strengths after 1 week immersion, 2 weeks immersion, and 3 weeks immersion at 60° C. is represented by $F_{60°\ C.\ [1\ week]}$, $F_{60°\ C.\ [2\ weeks]}$, or $F_{60°\ C.\ [3\ weeks]}$.

In addition, a specific method of measuring the piercing strength is described in Examples.

It is preferable that $F_{25°\ C.\ [1\ week]}$, $F_{25°\ C.\ [2\ weeks]}$ and $F_{25°\ C.\ [3\ weeks]}$ are 0.25 N or more. Meanwhile, it is preferable that $F_{60°\ C.\ [1\ week]}$, $F_{60°\ C.\ [2\ weeks]}$, and $F_{60°\ C.\ [3\ weeks]}$ are 0.25 N or more. When these six kinds of values are less than 0.25 N, the mechanical strength is low and the hydrogel may not be handled as a self-supported film More preferable six kinds of values are 0.25 to 20.0 N. Each of these six kinds of values may be 0.25 N, 0.5 N, 1 N, 5 N, 15 N or 20 N.

It is preferable that $(F_{25°\ C.\ [1\ week]} - F_{60°\ C.\ [1\ week]})/F_{25°\ C.\ [1\ week]}$, $(F_{25°\ C.\ [2\ weeks]} - F_{60°\ C.\ [2\ weeks]})/F_{25°\ C.\ [2\ weeks]}$, and $(F_{25°\ C.\ [3\ weeks]} - F_{60°\ C.\ [3\ weeks]})/F_{25°\ C.\ [3\ weeks]}$ are 0.5 Or less. When these three kinds of values are more than 0.5, the strength under high temperature alkaline environment may be reduced. The lower limit is, for example, −5.0. Each of these three kinds of values may be −5, −2, −1, 0, 0.1 or 0.5.

(Method for Producing Hydrogel)

For example, the hydrogel can be produced by performing the steps of:

(i) preparing a hydrogel precursor containing water, a polyvinylsulfonic acid-based polymer, a monofunctional monomer having one ethylenically unsaturated group, a polyfunctional monomer having 2 to 6 ethylenically unsaturated groups, and a polymerization initiator (preparation step); and (ii) polymerizing the monofunctional monomer and the polyfunctional monomer to obtain the hydrogel (polymerization step).

(1) Preparation Step

Any of a thermopolymerization initiator and a photopolymerization initiator can be used as the polymerization initiator in this step. Among them, it is preferable to use a photopolymerization initiator having small change in components before and after the polymerization. Examples of the photopolymerization initiator include 2-hydroxy-2-methyl-1-phenyl-propan-1-one (product name: Irgacure 1173, manufactured by BASF Japan Ltd.), 1-hydroxy-cyclohexyl-phenyl-ketone (product name: Irgacure 184, manufactured by BASF Japan Ltd.), 1-[4-(2-hydroxyethoxy)-phenyl]-2-hydroxy-2-methyl-propan-1-one (product name: Irgacure 2959, manufactured by BASF Japan Ltd.), 2-methyl-1-[(methylthio)phenyl]-2-morpholinopropan-1-one (product name: Irgacure 907, manufactured by BASF Japan Ltd.), 2-benzyl-2-dimethylamino-1-(4-morpholinophenyl)-butan-1-one (product name: Irgacure 369, manufactured by BASF Japan Ltd.), and the like. The polymerization initiator may be only one kind, or may be a mixture of a plurality of kinds.

It is preferable that a use amount of the polymerization initiator used is 0.1 to 5 parts by mass based on the total of 100 parts by mass of all monomers (monofunctional monomer, polyfunctional monomer, and arbitrarily, another monomer). When the use amount is less than 0.1 parts by mass, the polymerization reaction does not sufficiently proceed and an unpolymerized monomer may remain in the obtained hydrogel. When the use amount is more than 5 parts by mass, the hydrogel may have odor due to the residue of the polymerization initiator after the polymerization reaction or the physical properties may be deteriorated by the influence of the residue. A more preferable use amount is 0.2 to 3 parts by mass and a further preferable use amount is 0.4 to 1.5 parts by mass. The content may be 0.1 parts by mass, 0.2 parts by mass, 0.4 parts by mass, 0.8 parts by mass, 1 part by mass, 1.2 parts by mass, 1.5 parts by mass, 3 parts by mass or 5 parts by mass.

When a sheet-like hydrogel is produced, examples of molding of a hydrogel precursor into a sheet shape include (i) a method of injecting a hydrogel precursor into a mold, (ii) a method of pouring a hydrogel precursor between protective films, and retaining the obtained product at a constant thickness, (iii) a method of coating a hydrogel precursor on a protective film, and the like. The method (i) has an advantage that a hydrogel having an arbitrary shape can be obtained. The methods (ii) and (iii) have an advantage that a relatively thin hydrogel can be obtained. It is suitable that a hydrogel containing a supporting material is produced by the method (i).

In addition, the above-mentioned other monomer, additive, and the like may be contained in the hydrogel precursor.

(2) Polymerization Step

A network structure can be obtained by polymerizing the monofunctional monomer and polyfunctional monomer in the hydrogel precursor by heat application or light irradiation. The conditions for the heat application and the light irradiation are not particularly limited as long as a network structure can be obtained, and general conditions can be adopted.

(3) Other Steps

An example of the other step includes a step of containing an alkali component. In the step of containing an alkali component, an alkali component in an aqueous alkali solution is dissolved in water contained in the hydrogel by immersing the hydrogel after the polymerization in the aqueous alkali solution. This immersion is performed under conditions for obtaining a hydrogel having a desired alkali component amount. For example, the immersion can be performed under cooling at 4 to 80° C., under ambient temperature (about 25° C.), and under warming as an immersion temperature. An immersion time can be set to 6 to 336 hours under ambient temperature.

After the immersion, the water content may be adjusted by drying the hydrogel. An example of the adjustment includes a manner of making the mass of the hydrogel before immersion and the mass of the hydrogel after immersion almost the same.

Furthermore, when the hydrogel is used for a backfill used in electric anticorrosion process, a member for realkalization or a sheet of a member for desalting, it is preferable that the hydrogel has pressure-sensitive adhesiveness. In order to impart the pressure-sensitive adhesiveness, a pressure-sensitive adhesive agent such as an acrylic-based emulsion or a phosphoric acid ester-type surfactant should be added in the (1) molding step.

(Application of Hydrogel)

The hydrogel can be used in applications requiring strength and alkali resistance, such as an alkaline secondary battery, a backfill used in electric anticorrosion process, a member for realkalization, and a member for desalting. Furthermore, when electrical conductivity is imparted to the hydrogel, this can be used as a bioelectrode.

(1) Alkaline Secondary Battery

An alkaline secondary battery referred to herein is a secondary battery including a hydrogel as an electrolyte layer and/or a separator between a cathode and an anode. Examples of such a secondary battery include a nickel-hydrogen secondary battery, a nickel-zinc secondary battery, a zinc air battery, a lithium air battery, an aluminum air battery, a magnesium air battery, a calcium air battery, and the like. Since these secondary batteries include an aqueous alkali solution as an electrolytic solution, liquid leakage from the secondary batteries can be prevented by the hydrogel.

A configuration of the alkaline secondary battery is not particularly limited, and any of general configurations can be used. For example, as a cathode of a nickel-hydrogen secondary battery, nickel or a nickel alloy can be used, and as an anode, a hydrogen storing alloy can be used. As a cathode of a nickel-zinc secondary battery, nickel or a nickel alloy can be used, and as an anode, zinc or zinc oxide can be used. The cathode and the anode may be formed on a current collector composed of nickel, aluminum or the like.

When the hydrogel is used as a separator, it is preferable that the hydrogel is provided with a supporting material.

(2) Backfill Used in Electric Anticorrosion Process

A backfill referred to herein means a member that suppresses generation of deterioration such as a crack in a concrete structure including a steel material due to corrosion of the steel material. In this application, it is preferable that electrical conductivity is imparted to the hydrogel in order to flow a protection current through the steel material. Furthermore, it is preferable that pressure-sensitive adhesiveness is imparted to the hydrogel in order to facilitate electric contact between the steel material and an electrode to which a protection current flows.

(3) Member for Realkalization and Member for Desalting

Realkalization and desalting are required in a concrete structure. Since the previous realkalization and desalting have been performed by coating a composition therefor in situ, improvement in work efficiency is desired. When the hydrogel of the present invention is used, only sticking of a sheet in situ is necessary, so that the work efficiency can be more remarkably improved than before. It is preferable that pressure-sensitive adhesiveness is imparted to the hydrogel for realkalization and a desalting member.

EXAMPLES

The present invention will be further specifically described below by way of Examples, but the present invention is not limited by these at all. First, methods of measuring various physical properties that are measured in Examples will be described.

(Swelling Properties)

A hydrogel before alkali immersion was cut into a 5 mm×5 mm×2 mm thickness, and weighed. Thereafter, the hydrogel was placed into a 250 mesh tea bag made of polyethylene, and the tea bag was immersed in 100 mL of a 7M aqueous potassium hydroxide solution. Thereafter, after immersion under a temperature of 25° C. and 60° C. for 1 week, 2 weeks, and 3 weeks, the tea bag that had been drained for 10 minutes was weighed to obtain a tea bag containing the hydrogel swollen in a 7M aqueous potassium hydroxide solution. In addition, in the case where the hydrogel became soft and passed through the mesh when the tea bag was drained, this case was described as "liquefied". A degree of swelling was calculated by using, as a blank, the mass of a tea bag not containing the hydrogel immersed in a 7M aqueous potassium hydroxide solution, dividing a value obtained by subtracting the mass of the blank from the mass of the tea bag containing the hydrogel swollen in a 7M aqueous potassium hydroxide solution, by the mass of the hydrogel before swelling, and multiplying 100, and the resulting value was defined as a degree of swelling (%). Each of degrees of swelling after 1 week immersion, 2 weeks immersion, and 3 weeks immersion at 25° C. was represented by $B_{25° C. [1\ week]}$, $B_{25° C. [2\ weeks]}$, or $B_{25° C. [3\ weeks]}$, and each of degrees of swelling after 1 week immersion, 2 weeks immersion, and 3 weeks immersion at 60° C. was represented by $B_{60° C. [1\ week]}$, $B_{60° C. [2\ weeks]}$, or $B_{60° C. [3\ weeks]}$.

(Piercing Strength)

The obtained hydrogel was cut into a 30 mm×30 mm×2 mm thickness. After the cut hydrogel was immersed in 100 mL of a 7M aqueous KOH solution under a temperature of 25° C. and 60° C. for 1 week, 2 weeks, and 3 weeks, this was used as a hydrogel after alkali solution immersion. Various hydrogels that had been immersed in an alkali solution for a predetermined time were placed under environment at 25° C. for 3 hours, and then a piercing test was performed using a texture analyzer TA. XT Plus (manufactured by EKO Instruments Co., Ltd.). Each of the hydrogels was placed on a stand having a hole with a diameter of 7 mm, and was adjusted at a position at which a cylindrical jig made of stainless steel and having a diameter of 3 mm passed through the center of the hole. Thereafter, piercing was performed at a rate of 1.0 mm/sec, and a maximum stress until penetration of the tip of the jig was measured. This measurement was performed for five test pieces to obtain maximum stresses, and an average of the maximum stresses was defined as piercing strength. In that case, each of piercing strengths after 1 week immersion, 2 weeks immersion, and 3 weeks immersion at 25° C. was represented by $F_{25° C. [1\ week]}$, $F_{25° C. [2\ weeks]}$ or $F_{25° C. [3\ weeks]}$, and each of degrees of swelling after 1 week immersion, 2 weeks immersion, and 3 weeks immersion at 60° C. was represented by $F_{60° C. [1\ week]}$, $F_{60° C. [2\ weeks]}$ or $F_{60° C. [3\ weeks]}$.

(Weight Average Molecular Weight)

A weight average molecular weight (Mw) means a pullulan converted weight average molecular weight measured using gel permeation chromatography (GPC). Specifically, 50 mg of a sample was dissolved in 5 mL of a 0.2M aqueous $NaNO_3$ solution (permeation time: 24±1 hours (complete dissolution)), and filtered with an aqueous 0.45 μm chromatodisc (13N) manufactured by GL Sciences Inc. Thereafter, measurement was performed using a chromatograph under the following measuring conditions and a weight average molecular weight of the sample was obtained from a standard pullulan calibration curve that had been prepared in advance.

Apparatus used: HLC-8020GPC EcoSEC (incorporating RI detector and UV detector) manufactured by TOSOH CORPORATION Guard column: TSK GUARDCOLUMN PWXL-H (6.0 mm I.D.×4.0 cm)×1 manufactured by TOSOH CORPORATION Column: TSKgel G6000 PWXL (7.8 mm I.D.×30 cm)×1 manufactured by TOSOH CORPORATION+TSKgel G3000 PWXL (7.8 mm I.D.×30 cm)×1 manufactured by TOSOH CORPORATION Column temperature: 40° C.

Mobile phase: 0.2M aqueous $NaNO_3$ solution

Mobile phase flow rate: Reference side pump=0.6 mL/min

Sample side pump=0.6 mL/min

Detector: RI detector

Sample concentration: 1.0 wt %

Injection amount: 100 μL

Measurement time: 65 min

Sampling pitch: 500 msec

As standard pullulan samples for a calibration curve, those having product name "shodex", manufactured by SHOWA DENKO K.K. and having a weight average molecular weight of 2,560,000, 1,600,000, 380,000, 212,000, 100,000, 48,000, 23,700, 12,200, and 5,800 were used.

The above-mentioned standard pullulan samples for a calibration curve were grouped into A (1,600,000, 212,000, 48,000, 12,200) and B (2,560,000, 380,000, 100,000, 23,700, 5,800), and then 1 to 2.5 mg of each of those grouped in A was weighed to be dissolved in 2 mL of distilled water and 1 to 2.5 mg of each of those grouped in B was also weighed to be dissolved in 2 mL of distilled water. A standard pullulan calibration curve was obtained by injecting 100 μL of each of the prepared dissolution liquids grouped in A and B, and creating a calibration curve (cubic expression) from the resulting retention time after the measurement. The weight average molecular weight was calculated using the calibration curve.

Example 1

Twenty parts by mass of acrylic acid (manufactured by NIPPON SHOKUBAI CO., LTD.) and 0.3 parts by mass of sodium divinylbenzenesulfonate (manufactured by Tosoh Organic Chemical Co., Ltd.) were placed into a container and stirred. 50 parts by mass of Polynas PS-50 (manufactured by Tosoh Organic Chemical Co., Ltd., 20 mass % aqueous solution of sodium polystyrenesulfonate, weight average molecular weight: $5.7 \times 10^5$) as a polyvinylsulfonic acid-based polymer was dissolved in 29.5 parts by mass of ion-exchanged water. The previously prepared mixture of acrylic acid and sodium divinylbenzenesulfonate, and 0.2 parts by mass of Irgacure 1173 (manufactured by BASF Japan Ltd.) as a polymerization initiator were added to this solution, and the materials were stirred, so that a hydrogel precursor was prepared. A silicone frame having a thickness of 2 mm was placed on a peelable PET film, the hydrogel precursor was poured into the frame, and thereafter, a peelable PET film was placed on the hydrogel precursor. Thereafter, a step of irradiating the obtained product with an ultraviolet ray having an energy of 7000 $mJ/cm^2$ by a small-type UV polymerizing machine (manufactured by JATEC CO., LTD., J-cure1500, metal halide lamp type MJ-1500L) under conditions of a conveyer speed of 0.4 m/min and an interwork distance of 150 mm was performed three times. Accordingly, a sheet-like hydrogel having a thickness of 2 mm was prepared.

The prepared hydrogel was immersed in a 7M aqueous KOH solution for 1, 2, and 3 weeks under a temperature of 25° C. and 60° C., and swelling properties and piercing strength were evaluated.

Example 2

A hydrogel was prepared in the same manner as in Example 1, except that Polynas PS-50 was changed to Polynas PS-100 (manufactured by Tosoh Organic Chemical Co., Ltd., 20 mass % aqueous solution of sodium polystyrenesulfonate, weight average molecular weight: $8.7 \times 10^5$) as the polyvinylsulfonic acid-based polymer, the blending amount of PS-100 was set to 25 parts by mass, and the amount of the ion-exchanged water was set to 54.5 parts by mass.

Example 3

A hydrogel was prepared in the same manner as in Example 1, except that Polynas PS-50 was changed to Polynas PS-100 (manufactured by Tosoh Organic Chemical Co., Ltd., 20 mass % aqueous solution of sodium polystyrenesulfonate, weight average molecular weight: $8.7 \times 10^5$) as the polyvinylsulfonic acid-based polymer.

Example 4

A hydrogel was prepared in same manner as in Example 1, except that Polynas PS-50 was changed to Polynas PS-100 (manufactured by Tosoh Organic Chemical Co., Ltd., 20 mass % aqueous solution of sodium polystyrenesulfonate, weight average molecular weight: $8.7 \times 10^5$) as the polyvinylsulfonic acid-based polymer, the blending amount of PS-100 was set to 75 parts by mass, and the amount of the ion-exchanged water was set to 4.5 parts by mass.

Comparative Example 1

A hydrogel was prepared in the same manner as in Example 1, except that Polynas PS-50 was changed to Polynas PS-5 (manufactured by Tosoh Organic Chemical Co., Ltd., 20 mass % aqueous solution of sodium polystyrenesulfonate, weight average molecular weight: $1.2 \times 109$ as the polyvinylsulfonic acid-based polymer, the blending amount of PS-5 was set to 25 parts by mass, and the amount of the ion-exchanged water was set to 54.5 parts by mass.

Comparative Example 2

A hydrogel was prepared in the same manner as in Example 1, except that Polynas PS-50 was changed to 5 parts by mass of partially saponified-type polyvinyl alcohol JP-15 (manufactured by JAPAN VAM & POVAL CO., LTD., degree of saponification: 88.5 mol %, degree of average polymerization: 1500) and the amount of the ion-exchanged water was set to 74.5 parts by mass.

Comparative Example 3

A hydrogel was prepared in the same manner as in Example 1, except that Polynas PS-50 was changed to Jurymer AC20H (manufactured by TOAGOSEI CO., LTD., 20 mass % aqueous solution of acrylic acid-methacrylic acid copolymer), the blending amount of Jurymer AC20H was set to 25 parts by mass, and the amount of the ion-exchanged water was set to 54.5 parts by mass.

Comparative Example 4

A hydrogel was prepared in the same manner as in Example 1, except that a hydrogel precursor was prepared by placing 20 parts by mass of acrylic acid (manufactured by NIPPON SHOKUBAI CO., LTD.), 0.3 parts by mass of sodium divinylbenzenesulfonate (manufactured by Tosoh Organic Chemical Co., Ltd.), 79.5 parts by mass of ion-exchanged water, and 0.2 parts by mass of Irgacure 1173 (BASF Japan Ltd.) as a polymerization initiator, and stirring these materials.

Tables 1 and 2 show the constitution amounts of raw materials and results of the above-mentioned Examples and Comparative Examples together.

TABLE 1

|  |  |  |  | Example | | | | Comparative Example | | | |
|---|---|---|---|---|---|---|---|---|---|---|---|
|  |  |  |  | 1 | 2 | 3 | 4 | 1 | 2 | 3 | 4 |
| Constitution | Monofunctional monomer | Acrylic acid | Parts by mass | 20 | 20 | 20 | 20 | 20 | 20 | 20 | 20 |
|  | Polyfunctional monomer | Sodium divinylbenzenesulfonate |  | 0.3 | 0.3 | 0.3 | 0.3 | 0.3 | 0.3 | 0.3 | 0.3 |
|  | Polysulfonic acid-based polymer | Sodium polystyrenesulfonate (PS-50) Weight average molecular weight: $5.7 \times 10^5$ |  | 10 | — | — | — | — | — | — | — |
|  |  | Sodium polystyrenesulfonate (PS-100) Weight average molecular weight: $8.7 \times 10^5$ |  | — | 5 | 10 | 15 | — | — | — | — |
|  |  | Sodium polystyrenesulfonate (PS-5) Weight average molecular weight: $1.2 \times 10^5$ |  | — | — | — | — | 5 | — | — | — |
|  | Polyvinyl alcohol-based polymer | Polyvinyl alcohol (JP-15) Degree of average polymerization: 1500 Degree of saponification: 88.5 mol % |  | — | — | — | — | — | 5 | — | — |
|  | Acrylic acid-based polymer | Acrylic acid-methacrylic acid copolymer (Jurymer AC20H) |  |  |  |  |  |  |  | 5 | — |
|  | Polymerization initiator | Irgacure 1173 |  | 0.2 | 0.2 | 0.2 | 0.2 | 0.2 | 0.2 | 0.2 | 0.2 |
|  | Water |  |  | 69.5 | 74.5 | 69.5 | 64.5 | 74.5 | 74.5 | 74.5 | 79.5 |

TABLE 2

|  |  | Immersion temperature (° C.) | Immersion time (weeks) | Unit | Example | | | | Comparative Example | | | |
|---|---|---|---|---|---|---|---|---|---|---|---|---|
|  |  |  |  |  | 1 | 2 | 3 | 4 | 1 | 2 | 3 | 4 |
| Swelling properties | Degree of swelling $B_{25° C.}$ | 25 | 1 | % | 279 | 451 | 255 | 199 | 553 | 358 | 1022 | 869 |
|  |  |  | 2 |  | 265 | 428 | 232 | 196 | 560 | 364 | 1034 | 815 |
|  |  |  | 3 |  | 272 | 447 | 244 | 202 | 568 | — | 1031 | 823 |
|  | Degree of swelling $B_{60° C.}$ | 60 | 1 |  | 320 | 481 | 312 | 261 | 615 | 571 | 868 | 789 |
|  |  |  | 2 |  | 318 | 479 | 297 | 248 | 619 | 614 | 899 | 773 |
|  |  |  | 3 |  | 335 | 483 | 302 | 253 | 625 | — | 876 | 821 |
|  | $B_{60° C. [1\ week]}/B_{20° C. [1\ week]}$ |  |  | — | 1.15 | 1.07 | 1.22 | 1.31 | 1.11 | 1.59 | 0.85 | 0.91 |
| Piercing strength | Piercing strength $F_{25° C.}$ | 25 | 1 | N | 2.095 | 0.569 | 2.695 | 5.910 | 0.352 | 0.748 | 0.151 | 0.198 |
|  |  |  | 2 |  | 1.953 | 0.612 | 2.628 | 5.261 | 0.335 | 0.740 | 0.168 | 0.189 |
|  |  |  | 3 |  | 1.865 | 0.704 | 1.885 | 5.462 | 0.345 | — | 0.154 | 0.201 |
|  | Piercing strength $F_{60° C.}$ | 60 | 1 |  | 1.795 | 0.636 | 2.093 | 4.383 | 0.245 | 0.136 | 0.164 | 0.165 |
|  |  |  | 2 |  | 1.651 | 0.520 | 1.574 | 3.788 | 0.232 | 0.140 | 0.153 | 0.158 |
|  |  |  | 3 |  | 1.635 | 0.535 | 1.756 | 4.174 | 0.214 | — | 0.148 | 0.192 |
|  | $(F_{25° C. [1\ week]} - F_{60° C. [1\ week]})/F_{25° C. [1\ week]}$ |  |  | — | 0.14 | −0.12 | 0.22 | 0.26 | 0.32 | 0.82 | 0.02 | 0.16 |

From Tables 1 and 2, it is seen that in the hydrogels of Examples 1 to 4, the dependency of the degree of swelling and piercing strength on the immersion temperature and the immersion time is suppressed.

What is claimed is:

1. A hydrogel comprising water and a polyvinylsulfonic acid-based polymer in a polymer matrix,
wherein
said polymer matrix contains a copolymer of a monofunctional monomer having one ethylenically unsaturated group and a polyfunctional monomer having 2 to 6 ethylenically unsaturated groups,
said copolymer has a hydrophilic group binding to its main chain,
said polymer matrix is contained in an amount of 2 to 80 parts by mass in 100 parts by mass of said hydrogel,
a polymer derived from said polyfunctional monomer is contained in a proportion of 0.1 to 5 parts by mass in 100 parts by mass of said copolymer,
said polyvinylsulfonic acid-based polymer is contained in an amount of 0.1 to 150 parts by mass in 100 parts by mass of said polymer matrix, and
said polyvinylsulfonic acid-based polymer has a weight average molecular weight of 200,000 to 3,000,000.

2. The hydrogel according to claim 1, wherein when a degree of swelling during immersion in a 7M aqueous potassium hydroxide solution for 1 week under a temperature of 25° C. is represented by $B_{25°\ C.\ [1\ week]}$ and a degree of swelling during immersion in a 7M aqueous potassium hydroxide solution for 1 week under a temperature of 60° C. is represented by $B_{60°\ C.\ [1\ week]}$, said hydrogel has a degree of swelling of $B_{60°\ C.\ [1\ week]}$ and $B_{25°\ C.\ [1\ week]}$ being 550% or less.

3. The hydrogel according to claim 1, wherein said hydrogel has a ratio of degree of swelling $B_{60°\ C.\ [1\ week]}/B_{25°\ C.\ [1\ week]}$ (provided that $B_{60°\ C.\ [1\ week]}$ is a degree of swelling during immersion in a 7M aqueous potassium hydroxide solution for 1 week under a temperature of 60° C. and $B_{25°\ C.\ [1\ week]}$ is a degree of swelling during immersion in a 7M aqueous potassium hydroxide solution for 1 week under a temperature of 25° C.) of 0.5 to 1.5.

4. The hydrogel according to claim 1, wherein when a piercing strength during immersion in a 7M aqueous potassium hydroxide solution for 1 week under a temperature of 25° C. is represented by $F_{25°\ C.\ [1\ week]}$ and a piercing strength during immersion in a 7M aqueous potassium hydroxide solution for 1 week under a temperature of 60° C. is represented by $F_{60°\ C.\ [1\ week]}$, said hydrogel has a piercing strength of $F_{60°\ C.\ [1\ week]}$ and $F_{25°\ C.[1\ week]}$ being 0.25 N or more.

5. The hydrogel according to claim 1, wherein said hydrogel has a piercing strength ratio $(F_{25°\ C.\ [1\ week]} - F_{60°\ C.\ [1\ week]})/F_{25°\ C.\ [1\ week]}$ of 0.5 or less (provided that $F_{25°\ C.\ [1\ week]}$ is a piercing strength during immersion in a 7M aqueous potassium hydroxide solution for 1 week under a temperature of 25° C. and $F_{60°\ C.\ [1\ week]}$ is a piercing strength during immersion in a 7M aqueous potassium hydroxide solution for 1 week under a temperature of 60° C.).

6. The hydrogel according to claim 1, wherein said monofunctional monomer is selected from (meth)acrylic acid, (meth)acrylamide, sodium (meth)acrylate, potassium (meth)acrylate, zinc (meth)acrylate, dimethyl(meth)acrylamide, vinyl sulfonic acid, sodium vinyl sulfonate, p-styrenesulfonic acid, sodium p-styrenesulfonate, allylsulfonic acid, sodium allylsulfonate, 2-(meth)acrylamido-2-methylpropanesulfonic acid, 3-((meth)acryloyloxy)-1-propanesulfonic acid, potassium 3-((meth)acryloyloxy)-1-propanesulfonate, 3-((meth)acryloyloxy)-2-methyl-1-propanesulfonic acid, potassium 3-((meth)acryloyloxy)-2-methyl-1-propanesulfonate, N-vinylacetamide, N-vinylformamide, allylamine, 2-vinylpyridine, and 4-vinylpyridine,
said polyfunctional monomer is selected from divinylbenzene, sodium divinylbenzenesulfonate, divinylbiphenyl, divinylsulfone, diethylene glycol divinyl ether, pentaerythritol triallyl ether, pentaerythritol tetraallyl ether, dimethyldiallylammonium chloride, N,N'-methylenebis(meth)acrylamide, ethylene glycol di(meth)acrylate, glycerin tri(meth)acrylate, polyethylene glycol di(meth)acrylate, polypropylene glycol di(meth)acrylate, and polyglycerin di(meth)acrylate, and
said polyvinylsulfonic acid-based polymer is selected from polystyrenesulfonic acid, sodium polystyrenesulfonate, potassium polystyrenesulfonate, calcium poly styrenesulfonate, polyvinylsulfonic acid, sodium polyvinylsulfonate, and potassium polyvinylsulfonate.

7. A gel-like electrolyte comprising the hydrogel according to claim 1 and an alkali component contained in said hydrogel.

8. The gel-like electrolyte according to claim 7, wherein said alkali component is selected from sodium hydroxide, potassium hydroxide, calcium hydroxide, barium hydroxide, lithium hydroxide, rubidium hydroxide, cesium hydroxide, tetramethylammonium hydroxide, and tetraethylammonium hydroxide.

9. A secondary battery including the hydrogel according to claim 1.

10. A method for producing the hydrogel according to claim 1, comprising:
preparing a hydrogel precursor containing water, a polyvinylsulfonic acid-based polymer, a monofunctional monomer having one ethylenically unsaturated group, a polyfunctional monomer having 2 to 6 ethylenically unsaturated groups, and a polymerization initiator; and
polymerizing said monofunctional monomer and the polyfunctional monomer to obtain the hydrogel.

11. A secondary battery including the gel-like electrolyte according to claim 7.

* * * * *